(12) United States Patent
Li et al.

(10) Patent No.: US 11,638,274 B2
(45) Date of Patent: *Apr. 25, 2023

(54) SYSTEMS AND METHODS FOR ROBUST TIME DIVISION MULTIPLEX PATTERNS

(71) Applicant: ZTE CORPORATION, Guangdong (CN)

(72) Inventors: Xincai Li, Guangdong (CN); Yajun Zhao, Guangdong (CN); Hanqing Xu, Guangdong (CN); Ling Yang, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/483,246

(22) Filed: Sep. 23, 2021

(65) Prior Publication Data

US 2022/0015113 A1 Jan. 13, 2022

Related U.S. Application Data

(63) Continuation of application No. 16/800,960, filed on Feb. 25, 2020, now Pat. No. 11,219,040, which is a
(Continued)

(51) Int. Cl.
*H04L 12/28* (2006.01)
*H04W 72/12* (2023.01)
(Continued)

(52) U.S. Cl.
CPC ...... *H04W 72/1215* (2013.01); *H04B 7/0626* (2013.01); *H04B 7/2615* (2013.01);
(Continued)

(58) Field of Classification Search
CPC ... H04B 7/0626; H04B 7/2615; H04L 1/1812; H04L 1/1819; H04L 1/1854; H04W 72/0446; H04W 72/10; H04W 72/1215
See application file for complete search history.

(56) References Cited

U.S. PATENT DOCUMENTS 9,578,649 B2 2/2017 Dayal et al.
9,602,251 B2 3/2017 Yin et al.
(Continued)

FOREIGN PATENT DOCUMENTS

CN 106376082 A 2/2017
EP 3416452 A1 12/2018
(Continued)

OTHER PUBLICATIONS

Huawei, Hisilicon, "Miscellaneous correction to V2X in TS 36.300", 3GPP TSG-RAN WG2 Meeting #99, R2-1707958, Aug. 21-25, 2017, Berlin, Germany, 9 pages.
(Continued)

*Primary Examiner* — Phuc H Tran
(74) *Attorney, Agent, or Firm* — Duane Morris LLP

(57) ABSTRACT

A system and method for time division multiplexing using different radio access technologies is disclosed. In one embodiment, a method performed by a first communication node includes: identifying a time division multiplex pattern that associates a plurality of time domain resources with: one of an uplink signal and a downlink signal, and one of at least two radio access technologies; receiving the uplink signal using at least one first associated time domain resource; and transmitting the downlink signal using at least one second associated time domain resource, wherein the plurality of time domain resources are sequential, and wherein at least one first and second associated time domain resources are associated with different radio access technologies.

20 Claims, 10 Drawing Sheets

Related U.S. Application Data continuation of application No. PCT/CN2017/100411, filed on Sep. 4, 2017.

(51) Int. Cl.

| | | |
|---|---|---|
| *H04B 7/06* | (2006.01) | |
| *H04B 7/26* | (2006.01) | |
| *H04L 1/1812* | (2023.01) | |
| *H04W 72/0446* | (2023.01) | |
| *H04W 72/56* | (2023.01) | |

(52) U.S. Cl.
CPC ....... *H04L 1/1819* (2013.01); *H04W 72/0446* (2013.01); *H04W 72/56* (2023.01)

(56) References Cited

U.S. PATENT DOCUMENTS

| | | | |
|---|---|---|---|
| 10,548,129 | B2 | 1/2020 | Fwu |
| 10,917,932 | B2* | 2/2021 | Kim .................. H04W 72/1273 |
| 2013/0194994 | A1 | 8/2013 | Dayal et al. |
| 2013/0294297 | A1 | 11/2013 | Lee |
| 2015/0334620 | A1 | 11/2015 | Fu et al. |
| 2016/0164622 | A1* | 6/2016 | Yi .......................... H04L 5/0055 370/280 |
| 2017/0245245 | A1 | 8/2017 | Kim et al. |
| 2017/0295589 | A1 | 10/2017 | Sundararajan et al. |
| 2018/0192459 | A1 | 7/2018 | Xu et al. |
| 2020/0154496 | A1* | 5/2020 | Yi .......................... H04W 76/15 |
| 2020/0169990 | A1 | 5/2020 | Takeda |
| 2020/0260459 | A1* | 8/2020 | Jiang ................. H04W 72/0446 |

FOREIGN PATENT DOCUMENTS

| | | |
|---|---|---|
| EP | 2553958 B1 | 6/2019 |
| EP | 3665837 | 6/2020 |
| WO | 2016130175 A1 | 8/2016 |
| WO | 2019032888 A1 | 2/2019 |

OTHER PUBLICATIONS

LG Electronics Inc., "Correction on synchronization reference source for the frequency in 36.300", 3GPP TSGRAN2 Meeting #99, R2-1709137, Aug. 21-25, 2017, Berlin, Germany, 5 pages.

ZTE, "Discussion on NR-LTE Co-existence", 3GPP TSG RAN WG1 Meeting#88, R1-1701618, Athens, Greece Feb. 13-17, 2017, 11 pages.

Qualcomm, "NR LTE Coexistence Considerations", 3GPP TSG-RAN WG1 RAN1 NR R1-1702651, Athens, Greece Feb. 13-17, 2017, 4 pages.

Samsung, "LTE-NR Coexistence for UL", 3GPP TSG RAN WG1 Meeting #88 R1-1703011, Athens, Greece Feb. 13-17, 2017, 8 pages.

Huawei, "Overview of NR UL for LTE-NR coexistence", 3GPP TSG RAN WG1 Meeting #89 R1-1709383, Hangzhou, China, May 15-19, 2017, 15 pages.

LG, "Discussion on the Xn and enhanced X2 interface messages in NR-LTE coexistence", 3GPP TsSG RAN WG1 Meeting #90, R1-1713218, Aug. 21-25, 2017, 5 pages.

LG. "Simultaneous transmission and reception between LTE and NR", 3GPP TSG RAN WG1 Meeting #90, R1-1713220, Prague, Czech Republic, Aug. 21-25, 2017, 5 pages.

Samsung, LTE-NR Coexistence for UL, 3GPP TSG RAN WG1 NR Ad-hoc Meeting, R1-1700989, Spokane, USA, Jan. 16-20, 2017, 7 pages.

Apple. "Uplink transmission in NR NSA mode", 3GPP TSG-RAN WG1 NR AdHoc, R1-1710904, Qingdao, P. R. China, Jun. 27-30, 2017, 7 pages.

\* cited by examiner

SYSTEMS AND METHODS FOR ROBUST TIME DIVISION MULTIPLEX PATTERNS

CROSS-REFERENCE TO RELATED APPLICATION

The present application is a continuation of U.S. patent application Ser. No. 16/800,960, filed on Feb. 25, 2020, which is incorporated by reference herein in its entirety.

TECHNICAL FIELD

This disclosure relates generally to wireless communications and, more particularly, to systems and methods for time division multiplexing using different radio access technologies.

BACKGROUND

Fifth generation new radio (5G NR) is a radio access technology (RAT) that may be implemented in a higher and wider frequency band (e.g., above 3 GHz) in order to achieve a higher data rate than previous generation radio access technologies (RATs). This increased frequency band may include frequency domain duplexing (FDD) where different transmissions are sent at different frequencies at the same time. For example, uplink transmissions and downlink transmissions may be performed simultaneously, with uplink at 1.8 gigahertz (GHz) and with downlinks at 3.5 GHz. However, such FDD transmissions may cause interference despite being transmitted at different frequencies. For example, a second harmonic of the 1.8 GHz uplink signal may interfere with the 3.5 GHz downlink signal for the same UE. Such interference may undesirably degrade communication performance.

Furthermore, new generations of RATs, such as 5G NR, may share the same resources (e.g., frequency domain resources or time domain resources) as other RATs, such as 4G Long Term Evolution (LTE). Typically, user equipment (UE) may communicate with an associated base station (BS) based on scheduling as determined at the BS. This scheduling may take into consideration various techniques, such as carrier aggregation (CA) and the like, where transmission and reception of multiple different carriers is scheduled by a single associated BS. However, this scheduling of UEs by a single BS may break down when a UE communicates with multiple base stations without coordination among the BSs.

SUMMARY OF THE INVENTION

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the invention.

In one embodiment, a method performed by a first communication node includes: identifying a time division multiplex pattern that associates a plurality of time domain resources with: one of an uplink signal and a downlink signal, and one of at least two radio access technologies; receiving the uplink signal using at least one first associated time domain resource; and transmitting the downlink signal using at least one second associated time domain resource, wherein the plurality of time domain resources are sequential, and wherein at least one first and second associated time domain resources are associated with different radio access technologies.

In a further embodiment, a method performed by a first communication node includes: identifying a time division multiplex pattern that associates a plurality of time domain resources with: one of an uplink signal and a downlink signal, and one of at least two radio access technologies; transmitting the uplink signal using at least one first associated time domain resource; and receiving the downlink signal using at least one second associated time domain resource, wherein the plurality of time domain resources are sequential, and wherein at least one first and second associated time domain resources are associated with different radio access technologies.

BRIEF DESCRIPTION OF THE DRAWINGS

Various exemplary embodiments of the invention are described in detail below with reference to the following Figures. The drawings are provided for purposes of illustration only and merely depict exemplary embodiments of the invention to facilitate the reader's understanding of the invention. Therefore, the drawings should not be considered limiting of the breadth, scope, or applicability of the invention. It should be noted that for clarity and ease of illustration these drawings are not necessarily drawn to scale.

DETAILED DESCRIPTION OF EXEMPLARY EMBODIMENTS

Various exemplary embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the exemplary embodiments and applications described and illustrated herein. Additionally, the specific order or hierarchy of steps in the methods disclosed herein are merely exemplary approaches. Based upon design preferences, the specific order or hierarchy of steps of the disclosed methods or processes can be re-arranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

Figure 1:
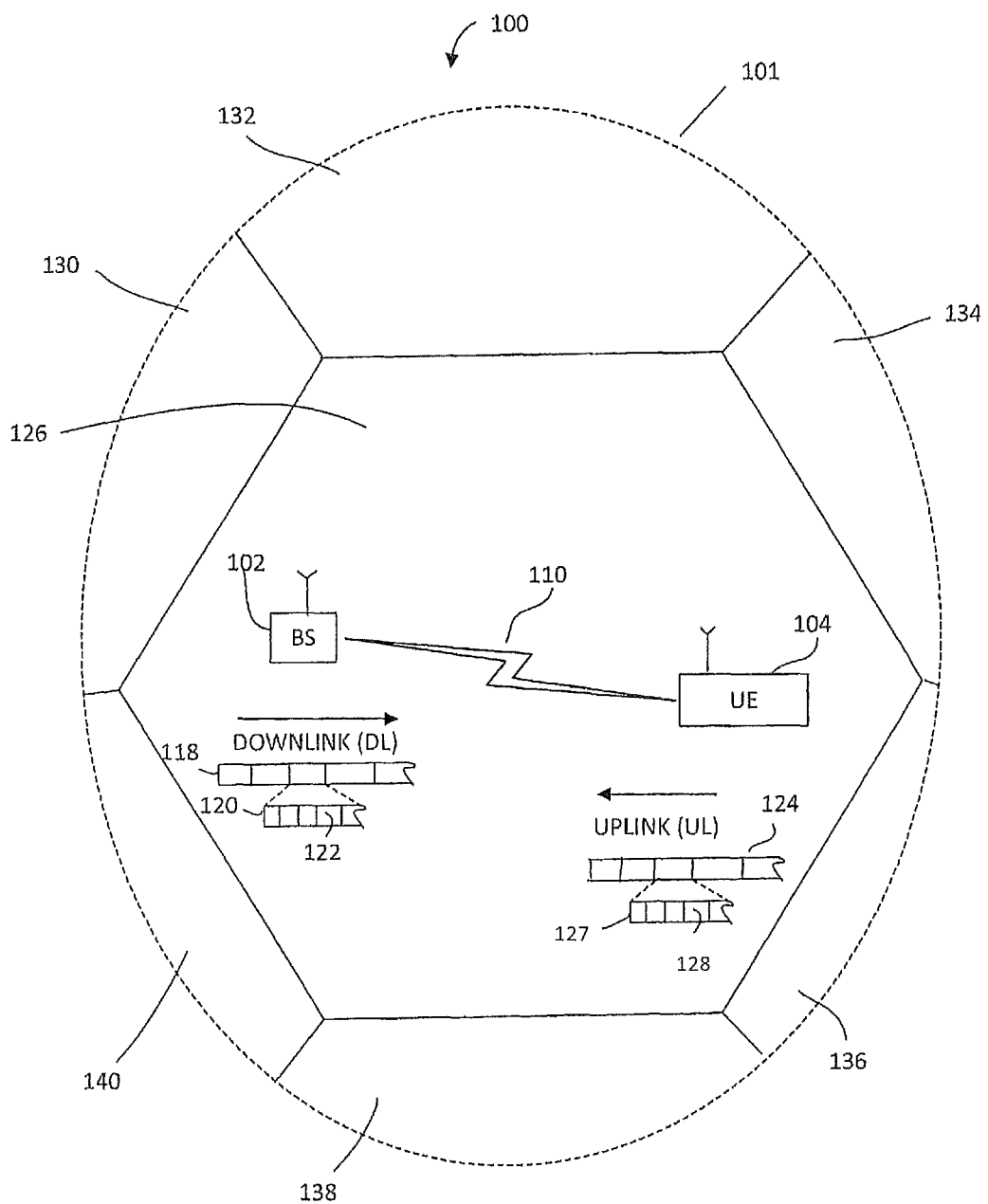
FIG. 1 illustrates an exemplary cellular communication network in which techniques disclosed herein may be implemented, in accordance with various embodiments of the present disclosure.

FIG. 1 illustrates an exemplary wireless communication network 100 in which techniques disclosed herein may be implemented, in accordance with an embodiment of the present disclosure. The exemplary communication network 100 includes a base station (BS) 102 and a user equipment (UE) device 104 that can communicate with each other via a communication link 110 (e.g., a wireless communication channel), and a cluster of notional cells 126, 130, 132, 134, 136, 138 and 140 overlaying a geographical area 101. In FIG. 1, the BS 102 and UE 104 are contained within the geographic boundary of cell 126. Each of the other cells 130, 132, 134, 136, 138 and 140 may include at least one base station (BS) operating at its allocated bandwidth to provide adequate radio coverage to its intended users. For example, the BS 102 may operate at an allocated channel transmission bandwidth to provide adequate coverage to the UE 104. The BS 102 and the UE 104 may communicate via a downlink time domain resource (e.g., radio frame 118, also more simply termed as a frame), and an uplink time domain resource (e.g., radio frame 124) respectively. Each radio frame 118/124 may be further divided into sub-frames 120/127 which may include data symbols 122/128. Stated another way, a time domain resource may have various levels of granularity, such that each time domain resource may be further divided into other time domain resources. In the present disclosure, the base station (BS) 102 and user equipment (UE) 104 are described herein as non-limiting examples of communication nodes, generally, which can practice the methods disclosed herein. Such communication nodes may be capable of wireless and/or wired communications, in accordance with various embodiments of the invention.

As described below, functional entities, such as UE, BS, etc. (either in physical or virtual form), may be similar to those mentioned above with respect to conventional networks. As would be understood by persons of ordinary skill in the art, however, such conventional functional entities do not perform the functions described below, and therefore, would need to be modified or specifically configured to perform one or more of the operations described below. Additionally, persons of skill in the art would be enabled to configure functional entities to perform the operations described herein after reading the present disclosure. The term configured as used herein with respect to a specified operation or function refers to a system, device, component, circuit, structure, machine, etc. that is physically or virtually constructed, programmed and/or arranged to perform the specified operation or function.

Figure 2:
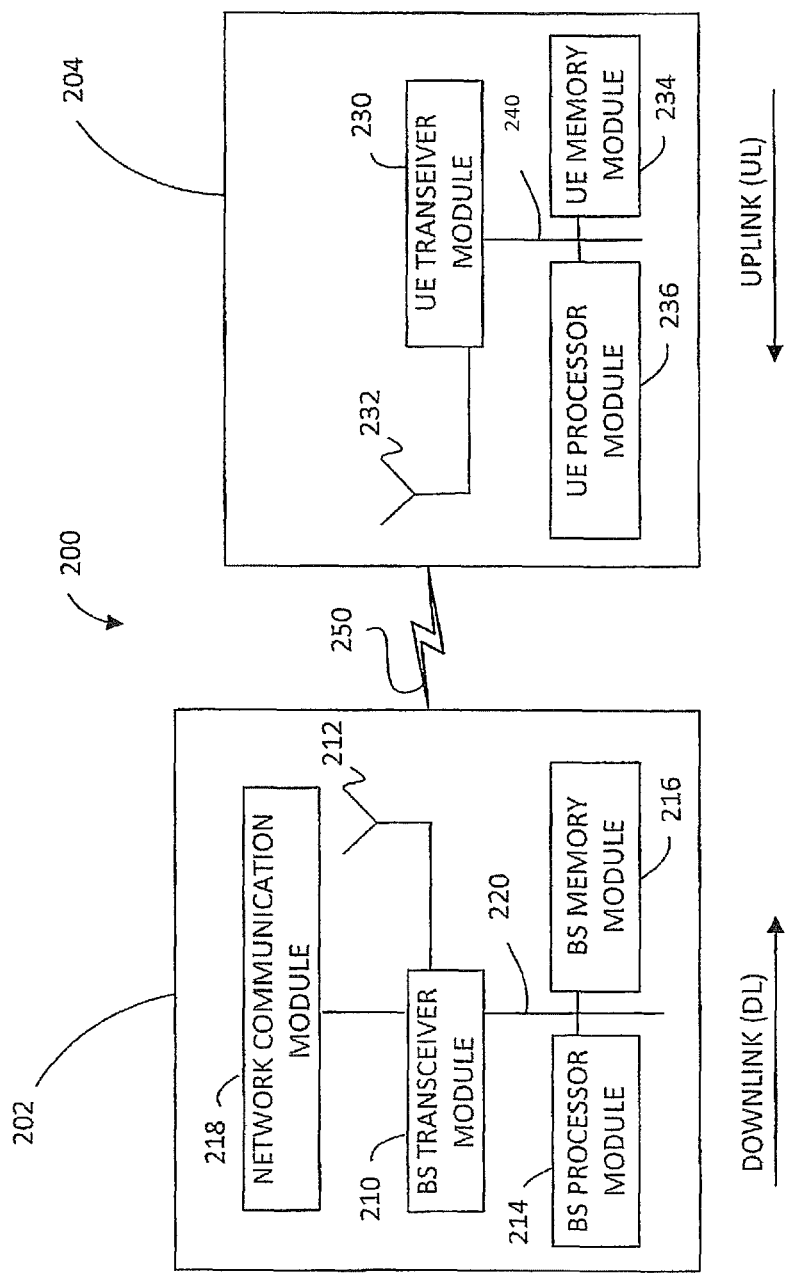
FIG. 2 is a block diagram that illustrates an exemplary base station and user equipment device, in accordance with some embodiments of the invention.

FIG. 2 is a block diagram that illustrates an exemplary system 200 including a base station (BS) 202 and user equipment (UE) 204 for transmitting and receiving wireless communication signals, e.g., orthogonal frequency division multiplex (OFDM)/orthogonal frequency division multiple access (OFDMA) signals, between each other. The system 200 may include components and elements configured to support known or conventional operating features that need not be described in detail herein. In one exemplary embodiment, system 200 can be used to transmit and receive data symbols in a wireless communication environment such as the wireless communication environment 100 of FIG. 1, as described above.

The BS 202 includes a BS transceiver module 210, a BS antenna 212, a BS processor module 214, a BS memory module 216, and a network communication module 218, each module being coupled and interconnected with one another as necessary via a data communication bus 220. The UE 204 includes a UE transceiver module 230, a UE antenna 232, a UE memory module 234, and a UE processor module 236, each module being coupled and interconnected with one another as necessary via a data communication bus 240. The BS 202 communicates with the UE 204 via a communication channel (e.g., link) 250, which can be any wireless channel or other medium known in the art suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as limiting the scope of the present invention.

In accordance with some embodiments, UE transceiver 230 may be referred to herein as an uplink transceiver 230 that includes a RF transmitter and receiver circuitry that are each coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a downlink transceiver 210 that includes RF transmitter and receiver circuitry that are each coupled to the antenna 212. A downlink duplex switch may alternatively couple the downlink transmitter or receiver to the downlink antenna 212 in time duplex fashion. The operations of the two transceivers 210 and 230 are coordinated in time such that the uplink receiver is coupled to the uplink antenna 232 for reception of transmissions over the wireless transmission link 250 at the same time that the downlink transmitter is coupled to the downlink antenna 212. Preferably there is close time synchronization with only a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme (e.g., a particular RAT). In some exemplary embodiments, the UE transceiver 230 and the base station transceiver 210 are configured to support industry standards for RATs such as the Long Term Evolution (LTE) and emerging 5G and New Radio (NR) standards, and the like. It is understood, however, that the invention is not necessarily limited in application to a particular RAT. Rather, the UE transceiver 230 and the base station transceiver 210 may be configured to support alternate, or additional, wireless data communication protocols, including future RATs or variations thereof.

In accordance with various embodiments, the BS 202 may be a next generation nodeB (gNodeB or gNB), serving gNB, target gNB, transmission reception point (TRP), evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 214 and 236, respectively, such that the processors modules 214 and 236 can read information from, and write information to, memory modules 216 and 234, respectively. The memory modules 216 and 234 may also be integrated into their respective processor modules 214 and 236. In some embodiments, the memory modules 216 and 234 may each include a cache memory for storing temporary variables or other intermediate information during execution of instructions to be executed by processor modules 214 and 236, respectively. Memory modules 216 and 234 may also each include non-volatile memory for storing instructions to be executed by the processor modules 214 and 236, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for" or "configured to" as used herein with respect to a specified operation or function refers to a device, component, circuit, structure, machine, signal, etc. that is physically constructed, programmed, formatted and/or arranged to perform the specified operation or function.

As introduced above, a RAT may standardize certain types of communications, such as an uplink (UL) or a downlink (DL) carrier signal (or more simply termed as an uplink or downlink signal), to be at particular carrier frequencies to coordinate communications of devices using that particular RAT. However, as the number of RATs begin to proliferate, and as newer generations of RATs become available and standardized for communication among devices, the chance of communication difficulties, or even failures, among devices communicating using different, or even the same, RAT may increase accordingly. This may be due to various factors, including the increased complexity (and associated room for error) of coordination among devices as the number of devices scales. Additionally, there may be increased opportunities for interference among signals as more signals share a same set of time domain, frequency domain, and/or code domain resources.

For example, both the LTE and 5G NR RATs include a standardized 1.8 GHz uplink signal. Also, the 5G NR RAT includes a 3.5 GHz downlink signal. Although the uplink and downlink signals are carried at different frequencies, the second harmonic of a 1.8 GHz signal may cause interference with a 3.5 GHz signal when transmitted at a same time. Accordingly, communications using an LTE RAT for uplink may cause interference with the same, or different devices that communicate using a different RAT for downlink, such as a 5G NR RAT. Also, communications within a same RAT, such as 5G NR, may experience interference between uplink and downlink signals.

Furthermore, communications among different RATs may interfere with each other when these different RATs utilize a same resource for communications. For example, as noted above, both LTE and 5G NR RATs utilize a standardized 1.8 GHz uplink signal. It may be more difficult for a receiver of such a signal to distinguish between the two when transmitted simultaneously than if they were transmitted at different times.

As noted above, coordination difficulties may be exacerbated when multiple devices are involved in a communication system without centralized management. This coordination difficulty, and resulting interference between signals, may also be referred to as a RAT congestion problem. For example, a first communication node, such as a BS or a UE, may provide information (e.g., CSI, a beacon, and the like) that may instruct other communication nodes as to how to communicate with the first communication node. Typically, such instructions may be in accordance with a single RAT.

However, interference may occur when multiple RATs are utilized for communication without coordination among the different RATs.

Accordingly, systems and methods in accordance with various embodiments may describe robust time division multiplexing (TDM) to solve at least the problems listed above. Robust TDM may include transmission of carrier signals among devices in accordance with a TDM pattern that associates a plurality of time domain resources among uplink and downlink signals and/or among at least two radio access technologies. Accordingly, the TDM pattern coordinates communications in a manner that allocates time domain resources among different RATs and in uplink or in downlink so that communications may not be degraded despite communications with same or different frequencies or RATs. Furthermore, the TDM pattern may account for information signals that are encoded on the carrier signals (e.g., a particular RAT in uplink or downlink) associated with a particular time domain resource. For example, a TDM pattern may also restructure the timing of feedback signals between downlink and uplink, such as a HARQ feedback signal by designating a particular time domain resource for transmission of the HARQ feedback signal.

A TDM pattern may include transmission (e.g., sending of signals) using time-domain resources in different frequency bands. For example, time domain resources may be utilized for uplink transmission (e.g., sending of an uplink signal) in a low frequency band and time domain resources for downlink transmission (e.g., sending of a downlink signal) in a high frequency band. Additionally, resources in a single band (e.g., frequency domain resource) may be shared between different RATs (e.g., LTE and 5G NR) in accordance with a TDM pattern. For example, the RAT for a particular time domain resource for a given uplink or downlink communication (e.g., sending and/or receiving of signals) may be alternated such that no single time domain resource is associated with two different RATs and/or with both uplink and downlink.

In certain embodiments, as an example of particular RATs, a UE may utilize a TDM pattern that allocates time domain resources between an uplink signal that is a 1.8 GHz LTE signal or a 1.8 GHz 5G NR signal and receive a downlink signal that is a 3.5 GHz 5G NR signal. The low frequency band (e.g., 1.8 GHz) may be noted as a band of a lower number, such as band 3, while the high frequency band (e.g., 3.5 GHz) may be noted as a band of a higher number, such as band 42. These bands are defined in the LTE 36.101 standard. In particular embodiments, LTE uplink data may be carried using a low frequency band (e.g., band 3) and 5G NR uplink data may be carried using the low frequency band (e.g., band 3). Also, 5G NR downlink data may be carried using the higher frequency band (band 42).

The time domain resources may be of a consistent granularity (e.g., where each time domain resource of a TDM pattern is of a same size) or varying granularity (e.g., where certain, or all, of the time domain resources of a TDM pattern are of different sizes). Examples of time domain resources in a TDM pattern may include a frame, subframe, slots, mini-slots, symbols, and the like.

In certain embodiments, a TDM pattern may include time domain resources whose associations are predefined prior to the initiation of communications between two communications nodes that utilize the TDM pattern. For example, TDM patterns may come preinstalled, loaded in each communication node, or instructed by a remote communication node to dictate how communications between particular communication nodes is to be conducted. In particular embodiments, these TDM pattern associations refer to associations of time domain resources to an uplink or downlink, a particular RAT, or encoded information for transmission on a carrier signal (e.g., an uplink or downlink signal using a particular RAT).

In other embodiments, a TDM pattern may include flexible time domain resources whose associations are determined on the fly and are not predefined. For example, a TDM pattern may include some or all flexible time domain resources whose associations are determined dynamically. By being determined flexibly (e.g., on the fly, dynamically, or not predefined), the time domain resource associations are determined based on rules that interpret conditions present after communication (e.g., an exchange of encoded data) between the nodes has begun. A TDM pattern that includes flexible time domain resources may also be a TDM pattern that is partially predefined. A partially predefined TDM pattern may contrast with TDM patterns whose time domain associations are all predefined or are all flexible. By being partially predefined, only certain time domain resources may be predefined, with the remainder determined on the fly.

These TDM patterns may be instructed or received from an external source, such as from messages between two communication nodes. This may include exchanges between two BSs (e.g., between to gNB/eNB through the Xn interface or enhanced X2 interface or as part of the operations and management (OAM) network architecture), between two UEs, or between a BS and a UE. Furthermore, through radio resource control (RRC) signaling, a UE may be instructed to utilize a particular TDM pattern.

Figure 3:
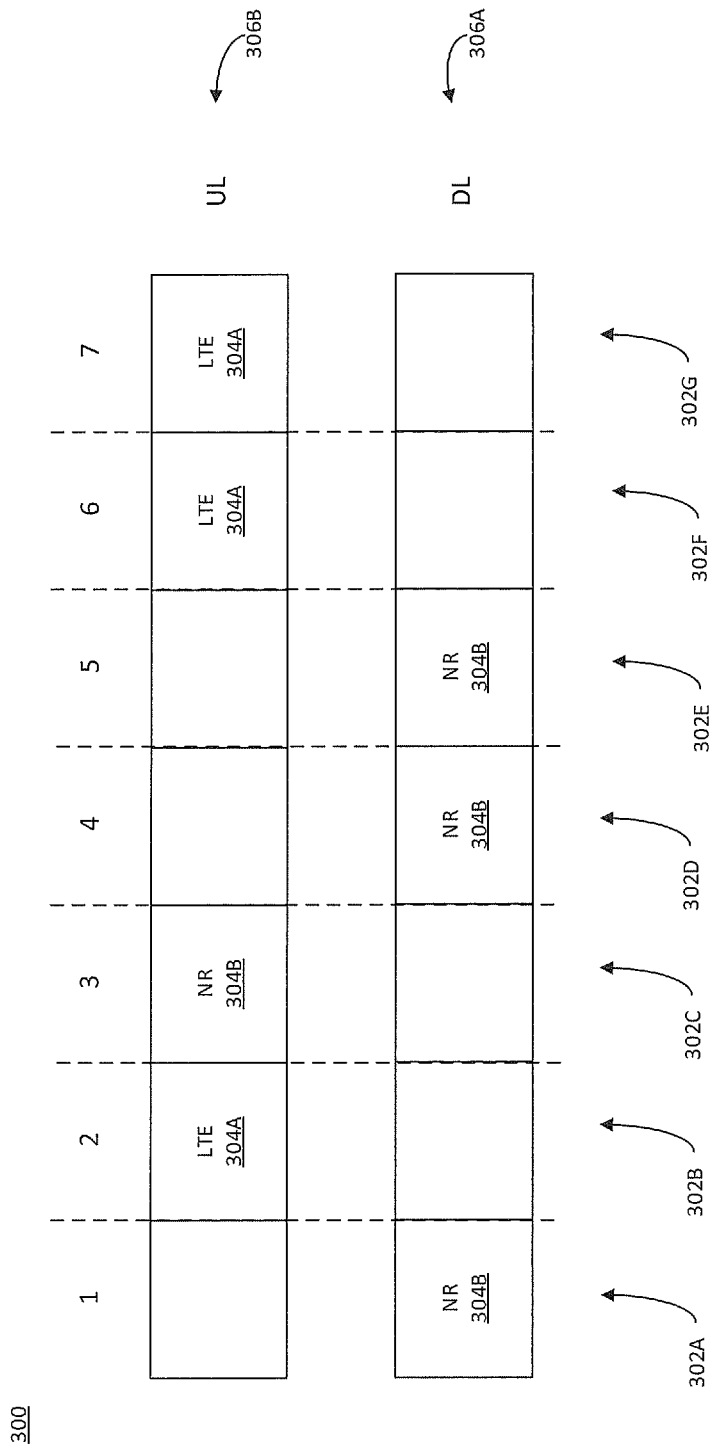
FIG. 3 is a block diagram that illustrates how resources may be associated across uplink, downlink, and RATs, in accordance with some embodiments of the invention.

FIG. 3 is a block diagram 300 that illustrates how resources may be associated across uplink, downlink, and RATs as a TDM pattern, in accordance with some embodiments of the invention. The block diagram 300 illustrates seven sequential time domain resources 302A-306G. In the block diagram 300, the time domain resources may be uniform (e.g., of the same type), but in other embodiments the time domain resources may not be uniform (as will be discussed below). Examples of the time domain resources include frames, subframes, slots, mini-slots, and symbols. In accordance with the TDM pattern, each time domain resource may be associated with either a particular RAT (e.g., LTE 304A or 5G NR 304B) and with either downlink 306A or uplink 306B. Accordingly, the TDM pattern organizes communications among different RATs and among uplink and downlink signals without interference as no time domain resource 302 is associated with both uplink and downlink or with multiple RATs, as will be discussed further below.

An exemplary data structure that describes TDM patterns is provided below in Table 1:

TABLE 1

LTE-NR TDM patterns

| LTE-5G NR | Subframe number | | | | | | | | |
|---|---|---|---|---|---|---|---|---|---|
| TDM Pattern | 0 | 1 | 2 | 3 | 4 | 5 | 6 | 7 | 8 | 9 |
| 0 | NR | S | LTE | LTE | LTE | NR | S | LTE | LTE | LTE |
| 1 | NR | S | LTE | LTE | NR | NR | S | LTE | LTE | NR |
| 2 | NR | S | LTE | NR | NR | NR | S | LTE | NR | NR |
| 3 | NR | S | LTE | LTE | LTE | NR | NR | NR | NR | NR |
| 4 | NR | S | LTE | LTE | NR | NR | NR | NR | NR | NR |
| 5 | NR | S | LTE | NR | NR | NR | NR | NR | NR | NR |
| 6 | NR | S | LTE | LTE | LTE | NR | S | LTE | LTE | NR |

Table 1 illustrates patterns of different RATs (e.g., LTE and 5G NR) associated with different time domain resources (e.g., distributed among 10 subframes) as different TDM patterns (e.g., six TDM patterns). For brevity, 5G NR is abbreviated at more simply NR. In addition to subframes associated with a particular RAT, certain subframes may be associated as a special predetermined type of subframe, denoted with a letter S. These special subframes may perform various functions during switching from downlink to uplink (e.g., without assignment to a particular RAT), as will be discussed further below.

Furthermore, a TDM pattern in Table 1 may be associated with either uplink or downlink or a particular RAT in a TDM pattern may be associated with uplink or downlink (e.g., uplink or downlink communications using uplink or downlink signals). Accordingly, each of the time domain resources (e.g., subframes) of the six TDM patterns may be associated with either uplink or downlink communications but not both. For example, each of the RATs may be associated with either uplink or downlink communications. Specifically, the LTE RAT may be associated with an 1.8 GHz LTE uplink communications while the 5G NR RAT may be associated with a 3.5 GHz 5G NR downlink communications. Stated another way, LTE and 5G NR RATs may share a LTE FDD band. By sharing the LTE FDD band, uplink time domain resources (e.g., subframes) of LTE time domain duplex (TDD) in downlink or uplink (DL/UL) configurations (e.g., DL/UL configurations, or one of the TDM patterns of Table 1) may be shared with downlink time domain resources (e.g., subframes) of a 5G NR TDD. The 5G NR TDD may be in a particular DL/UL configuration (e.g., one of the TDM patterns of Table 1) for uplink at the 1.8 GHz band (similar to LTE) and downlink at 3.5 GHz band (in accordance with 5G NR).

Figure 4:
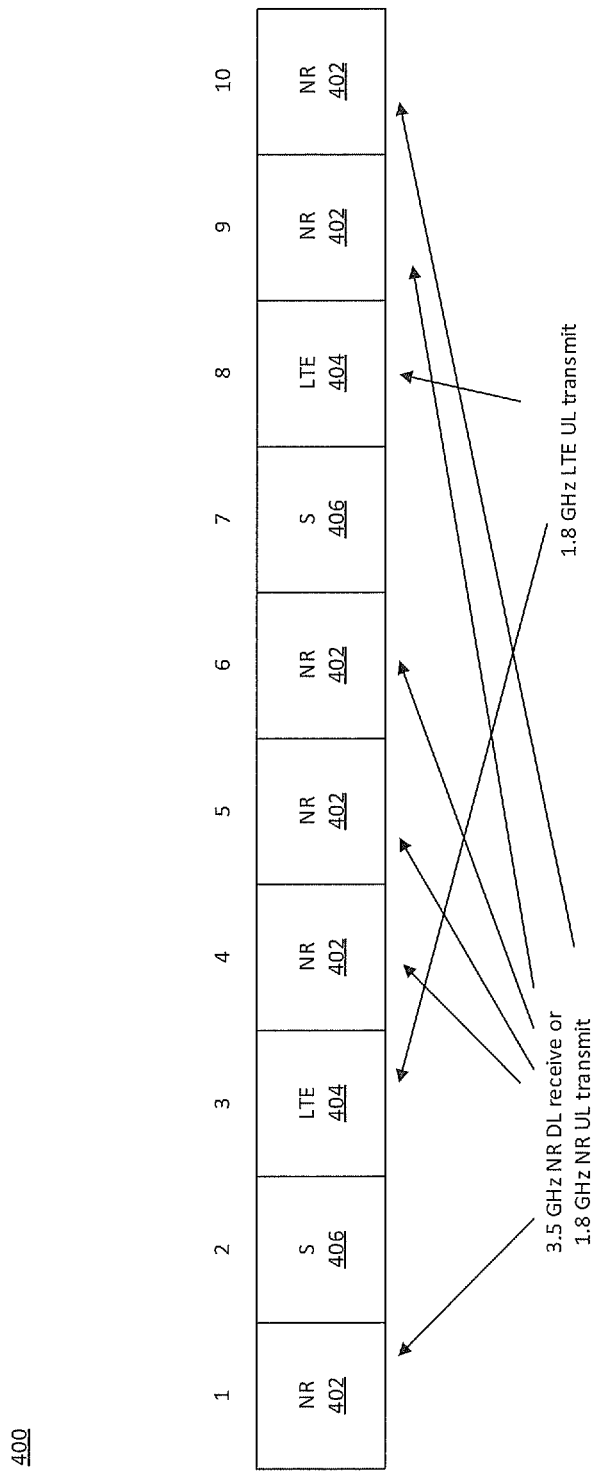
FIG. 4 is a block diagram that illustrates how time domain resources that are part of special subframes may be associated in a time division multiplex (TDM) pattern, in accordance with some embodiments of the invention.

FIG. 4 is a block diagram 400 that illustrates how time domain resources that are part of special subframes may be associated in a TDM pattern, in accordance with some embodiments of the invention. The block diagram 400 reflects a version of TDM pattern number 2 of Table 1 above, where the 5G NR RAT 402 refers to either an uplink signal (e.g., at 1.8 GHz) or a downlink signal (e.g., at 3.5 GHz) and the LTE RAT 404 refers to an uplink signal (e.g., at 1.8 GHz).

A special time domain resource may be an interspersed time domain resource between in a TDM pattern that facilitates transitions between uplink and downlink. For ease of explanation, discussion of a special time domain resource will focus on a special subframe, such as a special subframe 406 of FIG. 4. However, special time domain resources may be of any granularity and not just at the subframe granularity. For example, a special time domain resource may be of the granularity of a frame, subframe, slots, mini-slots, symbols, and the like.

Special subframes 406 may be defined as part of a LTE TDD DL/UL configuration, but may be redefined as part of a TDM pattern as discussed herein. Traditionally, special subframes in a LTE TDD DL/UL configuration function only as a guard period to facilitate the transition between uplink and downlink. However, in some embodiments, the time domain resources of a special subframe may be restructured in a TDM pattern for data communications. For example, the special subframes may be utilized for 5G NR transmissions. Stated another way, a TPM pattern may associate time domain resources that would be associated with a guard period (e.g., a special subframe in a LTE RAT) to be, rather, associated with data transmissions under the 5G NR RAT.

In further embodiments, the time domain resource that would have been allocated to a special subframe may be structured to include a downlink pilot slot (DwPTS) part, guard period (GP) part, and/or an uplink pilot slot (UpPTS part) of a fixed duration. The UpPTS part of the special subframe allocated time domain resource may be used for LTE UL transmission, such as a sounding reference signal (SRS), preamble, shortened physical uplink control channel (sPUCCH), or a shortened physical uplink shared channel (sPUSCH). Also, the DwPTS part of the special subframe may be utilized for 5G NR transmissions. Furthermore, the GP part may include a fixed duration such as, for example, 1 OFDM symbol. In certain embodiments, the DwPTS part is followed by the GP part, which is followed by the UpPTS part. However, other orderings may be contemplated as desired for particular applications in accordance with various embodiments. For example, the ordering of the parts may be in reverse order or an order where the GP part is the first or the last part.

Furthermore, in particular embodiments, the downlink pilot slot (DwPTS) part, guard period (GP) part, and/or an uplink pilot slot (UpPTS part) may be of a flexible duration. By being of a flexible duration, the various parts may have varying durations based upon various factors such as a priority (discussed further below) accorded to the data encoded in these parts, type of transmitting or receiving communication nodes (e.g., whether a UE or a BS is used), the timing of the uplink or downlink transmission, and the like.

In addition to TDM patterns that structure time domain resources for transitions between uplink and downlink, such as a special subframe, TDM patterns may also be varied based upon the types of communication nodes that may utilize the TDM patterns for communications. In certain embodiments, a TDM pattern may be cell-specific, such as where a particular TDM pattern is utilized for communication nodes that are within a particular cell, discussed further above.

In particular embodiments, a TDM pattern may be utilized for particular types of communication nodes, such as where a BS may utilize different TDM patterns than a UE, or where different BSs or different UEs would utilize different TDM patterns. Additionally, different groups of communication nodes may utilize different TDM patterns, such as where a first group of BSs and UEs would utilize TDM patterns that are different than another group of BSs and UEs. The distinctions between these groups may be based on a variety of factors, such as the manufacturer, operator, or date of manufacture of the communication nodes, or the particular version or type of software that each particular group of BSs and UEs is running. Furthermore, BSs (e.g., gNB) may utilize higher layer signaling to communicate TDM patterns, or aspects of TDM patterns, for use in communications between communication nodes. This higher layer signaling may refer to the higher layers of the open systems interconnections (OSI) model, such as the application layer, presentation layer, session layer, or transport layer of the OSI model. Examples of higher layer signaling may include RRC signaling or system information block (SIB) signaling, or remaining minimum system information (RMSI).

For example, in certain embodiments, this higher layer signaling may communicate instructions to utilize a TDM pattern that is the same as a LTE TDD configuration, such that the TDM pattern is entirely in accordance with the LTE RAT. In other embodiments, the higher layer signaling many communicate instructions to utilize a TDM pattern that is a modification of the LTE TDD configuration, such as where downlink signals utilize the 5G NR 3.5 GHZ band.

In a number of embodiments, a TDM pattern may be determined based on priority and applied using a priority rule. These priority rules may recite criteria for use of a particular TDM pattern over another, or for the use or non-use of a TDM pattern. Additionally, priority may be a criteria for association of flexible time domain resources, as discussed above. For example, a particular association of a time domain resource may be dictated by the priority accorded to the underlying information to be associated with the time domain resource of a TDM pattern.

One exemplary embodiment of a priority rule may be that a channel (e.g., a signal) which may carry high value information may be transmitted before a channel (e.g., a signal) that transmits lower value information. This value may be directly related to priority. Examples of higher value information may include information that is related to real time communications (as opposed to non-real time communications). This value (e.g., priority) may, for each signal, be based on the signal's encoded information and may be predefined and/or coordinated (e.g., communicated) among different communication nodes (e.g., between an eNB and a gNB). For example, based on the high priority of certain information, a TDM pattern may associate a time domain resource with the appropriate RAT and uplink or downlink signal to carry the high priority information ahead of information that is not high priority, or information that is low priority.

As another exemplary embodiment of a priority rule, communications from a primary cell group (PCG) may be accorded higher priority than communications from a secondary cell group (SCG), or a non PCG. Identification with a PCG, a SCG, or a non PCG may be predefined and assigned to the various communication nodes that would constitute a cell group (e.g., a group of communication nodes).

As another exemplary embodiment of a priority rule, a short transmission (e.g., the time resource required to send particular encoded information) may be accorded a higher priority than a longer transmission. These transmissions may be an uplink transmission or a downlink transmission.

As another exemplary embodiment, priority may be ascribed based on the size of the information, or of the signal, under consideration. For example, priority may be assigned based on a load size information or cache size information of the information to be transmitted. Higher priority may be assigned for information of a larger size, while lower priority may be assigned for information with a smaller size.

Furthermore, priority may be ascribed based on the type of channel. For example, certain types of channels (e.g., PUSCH or PRACH) may be associated with a higher priority than other types of channels. Additionally, when the channels are numbered or otherwise ordered, priority may be directly or inversely related to the channel number or ordering among the channels.

As another exemplary embodiment of a priority rule, certain types of signals used in particular RATs may be accorded higher priority than other types of signals in the same, or other RATs. For example, certain RATs (e.g., LTE) may be accorded higher priority in certain time periods, while other RATs (e.g., 5G NR) may be accorded higher priority in other time periods.

As another exemplary embodiment, priority may be based on the data transmitted in accordance with a buffer scheduling request (BSR) size of each RAT. For example, if LTE has a larger BSR size, then LTE data may accorded higher priority and be transmitted firstly (ahead of data encoded using other RATs). However, if 5G NR has a larger BSR size, then 5G NR data may be accorded higher priority and be transmitted firstly (ahead of data encoded using other RATs).

In certain embodiments, instructions concerning TDM patterns may be retransmitted if they are not fully or properly received. For example, if the eNB or gNB has not received an anticipated instruction concerning a TDM pattern from another communication node, it may request retransmission of the anticipated instruction concerning the TDM pattern in a retransmission.

Figure 5:
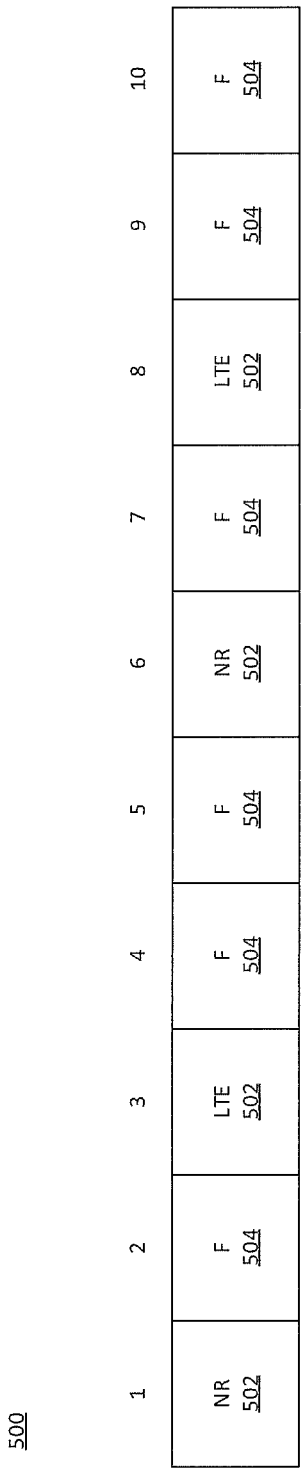
FIG. 5 is a block diagram 500 that illustrates a TDM pattern with flexible time domain resources, in accordance with some embodiments of the invention.

FIG. 5 is a block diagram 500 that illustrates a TDM pattern with flexible time domain resources, in accordance with some embodiments of the invention. By having flexible time domain resources in addition to predefined time domain resources, the TDM pattern may be partially predefined. This means that at least some time domain resources are flexible (e.g., not predefined), with the remainder being predefined. As introduced above, by being predefined, certain predefined time domain resources 502 may be assigned without regard to priority or any factor determinable after the initialization of communications using the TDM pattern. The predefined time domain resources 502 may be associated with a particular RAT and associated with uplink or downlink. For example, certain predefined time domain resources may be predefined to be associated with uplink using LTE (e.g., at 1.8 GHz) or may be associated with downlink (e.g., at 3.5 GHz) or uplink (e.g., at 1.8 GHz) using 5G NR. As introduced above, time domain resources can be predefined in certain embodiments as instructed, such as from a physical downlink control channel (PDCCH), which is a physical channel that carries downlink control information (DCI).

The other time domain resources may be flexible time domain resources 504, or time domain resources whose associations are determinable on the fly (e.g., based on information gathered after the initialization of communications using the TDM pattern). In certain embodiments, the flexible time domain resources 504 may be flexibly associated among a select group of options. For example, the flexible time domain resources 504 may be flexibly associated with uplink or downlink but are predefined to be associated with a particular RAT (e.g., 5G NR). Accordingly, the type of RAT that the flexible time domain resource 504 is associated with is predefined, but the uplink or downlink aspect association for that RAT may be flexible (e.g., not predefined).

As introduced above, flexible time domain resources may be associated based on priority. Also, higher priority signals may be more flexibly assigned than lower priority signals. Stated another way, higher priority signals may be assigned to flexible time domain resources with fewer restrictions than lower priority signals.

In particular embodiments, priority may be assigned based upon the type of RAT. For example, time domain resources for LTE transmissions may be accorded a higher priority over time domain resources for 5G NR transmissions. Alternatively, in another example, time domain resources for 5G NR transmissions may be accorded a higher priority over time domain resources for LTE transmissions.

In certain embodiments, higher priority information or signals may be assigned to flexible time domain resources and transmitted without need for channel sensing or listen before talk (LBT) type communication protocols before transmission. However, lower priority signals may be assigned to flexible time domain resources and transmitted only if such an assignment would be in accordance with results from channel sensing or LBT type communication protocols. However, in yet further embodiments, all time domain resources are to follow LBT type communication protocols regardless of priority (but still be flexible time domain resources as they may be flexibly associated with either one of (1) uplink or downlink and (2) a RAT). As introduced above, the time domain resources of a TDM may be of any type, including one or more slots, one or more subframes, of a fixed time duration or of a flexible time duration.

In some embodiments, communication of information through a particular communication interface concerning a TDM pattern may be unsuccessful or more difficult (e.g., when the information is partially received or not received). To resolve this problem, other communication interfaces may be utilized to communicate the information concerning the TDM pattern. For example, when information concerning a TDM pattern is unsuccessful or more difficult through an Xn (e.g., an interface between an LTE BS and a 5G NR BS), enhanced X2 (an interface between LTE BSs), or operations administration and maintenance (OAM) interface, the information concerning the TDM pattern may be relayed by a UE instead. This process may be termed as UE forwarding. UE forwarding may be performed by a first BS (e.g., eNB) communicating the TDM pattern information to a UE using RRC or PDCCH. Then, the UE may relay the TDM pattern information to the appropriate second BS using a physical uplink control channel (PUCCH) or a PUSCH.

In certain embodiments, a TDM pattern may associate time domain resources in accordance with a particular RAT. For example, a TDM pattern may associate time domain resources with either LTE or 5G NR in an uplink (e.g., sharing a FDD carrier in order to communicate TDD PRACH resources). Also, a TDM pattern may associate time domain resources in accordance with hybrid automatic report request (HARQ) feedback. For example, time domain resources in a TDM pattern may be associated with HARQ feedback. Stated another way more specifically, a TDM pattern that includes a LTE FDD carrier for HARQ may be determined in accordance with a downlink reference UL/DL configuration for TDD as defined for FDD-SCell in TDD-FDD carrier aggregation with TDD-PCell.

Furthermore, downlink may be associated with time domain resources in a TDM pattern (e.g., a DL-reference UL/DL configuration) via a variety of methods. In certain exemplary embodiments, time domain resources associated with downlink in a TDM pattern may be predefined (e.g., fixed). For example, the time domain resources associated with downlink may be predefined as part of a TDM pattern (e.g., as a DL-reference UL/DL configuration). In another exemplary embodiment, associations of time domain resources with downlink in a TDM pattern (e.g., DL-reference UL/DL configuration) may be flexibly chosen among a set number of options (e.g., be semi-static). For example, a TDM pattern with particular time domain resources for association with downlink (e.g., a DL-reference UL/DL configuration) may be chosen in accordance with a candidate set of TDM patterns (e.g., TDD UL/DL configurations). As another exemplary embodiment, uplink time domain resources may reference received downlink time domain resources of a same or different TDM pattern (e.g., as HARQ feedback, or as an acknowledgement (ACK) or a non-acknowledgement (NACK) feedback signal for retransmissions). For example, a UE may provide HARQ feedback as a HARQ ACK of the LTE FDD PDSCH according to a TDM pattern. Similarly, a BS may receive the HARQ ACK in accordance with the same TDM pattern. In certain embodiments, a subframe other than the fourth subframe (e.g., the third subframe) of a TDM pattern may be utilized for the HARQ feedback signal (e.g., HARQ ACK or NACK).

Additionally, as discussed above, TDM patterns may assign time domain resources to encode different types of information in accordance with various RATs. As one exemplary embodiment, a TDM pattern may associate various time domain resources (e.g., OFDM symbols) with information such as a PUSCH, PUCCH, SRS, PRACH, s-PUSCH, or s-PUCCH of the LTE RAT. Also, a TDM pattern may associate various time domain resources (e.g., a subframe) with a PUSCH, SRS, PUCCH, or PRACH of a 5G NR RAT. As another exemplary embodiment, a TDM pattern may associate various time domain resources (e.g., OFDM symbols) with information such as a PUSCH, PUCCH, SRS, PRACH, s-PUSCH, or s-PUCCH of LTE RAT, with other information such as a PDSCH, PDCCH, CSI-RS, or SS block of a 5G NR RAT transmitted on another OFDM symbols.

Various examples of the above embodiments are discussed further below.

As introduced above, a TDM pattern may associate a time domain resource with either one of: (1) uplink or downlink; and (2) a particular RAT. The time domain resource may be of a consistent (e.g., where each time domain resource is of a same size) or varying (e.g., where certain time domain resources, or all of the time domain resources of a TDM pattern are of a different size) granularity. Accordingly, a TDM pattern may solve the harmonic interference problem, introduced above, by ensuring that carrier frequencies that may cause harmonic interference with other carrier frequencies are not transmitted simultaneously. Also, the TDM pattern may solve the RAT congestion problem, introduced above, by ensuring that carrier signals for specific RATs are transmitted at particular times, and not transmitted simultaneously.

Figure 6:
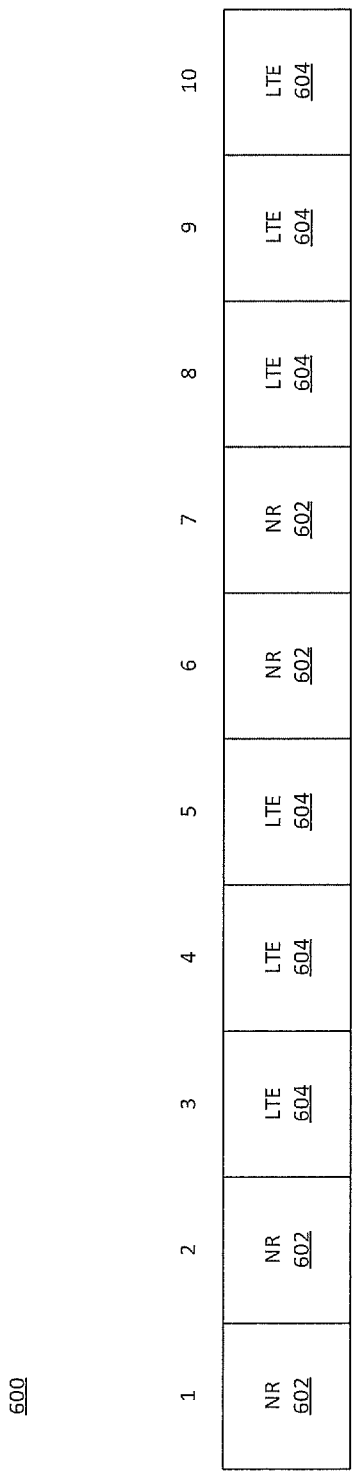
FIG. 6 is a block diagram that illustrates a predefined TDM pattern with subframes, in accordance with some embodiments.

As discussed above, TDM patterns may include time domain resources that are predefined. By being predefined, time domain resource associations may be known in the TDM pattern prior to utilizing the TDM pattern for communications. FIG. 6 is a block diagram 600 that illustrates a predefined TDM pattern with subframes, in accordance with some embodiments. The predefined TDM pattern may associate different time domain resources with a particular RAT and either uplink or downlink. For example, the predefined TDM pattern may associate certain time domain resources (e.g., subframes) with either 5G NR 3.5 GHz downlink 602 or LTE 1.8 GHz uplink 604.

In certain embodiments, a TDM pattern may include a switching period provided for switching between uplink downlink communications. A switching period may be a type of special time domain resource. Aspects of this switching period are discussed above, such as in connection with the special time domain resources (e.g., special subframes). When the TDM pattern is predefined, this switching period for switching between uplink and downlink transmissions may also be predefined. Accordingly, a predefined TDM pattern may include a predefined switching period in addition to a predefined association of different time domain resources with a particular RAT and either uplink or downlink. For example, the predefined switching period can be any increment of time domain resource, such as 2 ms or 3 ms and the like. Accordingly, a communication node (e.g., a UE) may carry out uplink and downlink communications using the predefined switching period. This switching period may be inserted at a switch between uplink or downlink signals. For example, a TDM pattern may, for a communication node (e.g., a UE), include a switching period of 2 ms between receiving a high frequency 5G NR downlink signal and sending a low frequency LTE uplink signal.

In certain embodiments, the switching period may be flexibility assigned based on different criteria. For example, the switching period may be different for different types of communication nodes (e.g., a UE or a BS) or for different types of RATs (e.g., LTE or 5G NR). Additionally, the order in which information may be sent (e.g., whether there is a uplink to downlink transition or downlink to uplink transition) may be based on priority. For example, information with higher priority may be sent first, with lower priority items sent after the higher priority information.

In certain embodiments, a predefined TDM pattern may be communicated between different communication nodes. For example, the predefined TDM pattern may be communicated between base stations (e.g., gNB and eNB) via backhaul signaling, such as the X2 port or the Xn port discussed further above. The base stations may then notify their associated UEs by RRC signaling or remaining minimum system information (RMSI) signaling. Accordingly, the UE may receive instruction on which TDM pattern to use, and what time domain resources should be associated with which RAT or either of an uplink signal or a downlink signal.

A predefined TDM pattern may be communicated in a variety of manners. For example, the predefined TDM pattern may be identified by transmitting an index value from which a receiving communication node may select the appropriate TDM pattern for use. As another example, a TDM pattern may be communicated as a map (e.g., a time domain multiplexed time domain resource map) as "LTE, NR, NR, LTE, LTE, NR, NR, LTE, LTE, NR" by signaling 1001100110. In this example, LTE is indicated with the value 1 and NR is indicated with the value 0. Also, each of the values may be associated with one of a set of sequential time domain resources. In certain embodiments, it may be desirable to communicate only the TDM pattern index value rather than the TDM pattern map to reduce signaling overhead. For example, transmission of only an index value (e.g., an index value of 3 for selection of TPM pattern number 3 of Table 2 above) or other instruction for selection of the appropriate TDM pattern may require less overhead than communicating an entire TDM pattern as a TDM pattern map.

As another example, associations with a time domain resource in a predefined TDM pattern may be communicated over LTE time domain resources. These LTE time domain resources may include an uplink scheduling PUSCH, aperiodic SRS and aperiodic and periodic uplink control information (UCI) transmissions. UCI transmissions may include a scheduling request, a CSI feedback, a precoding matrix indicator (PMI), and rank indicator (RI) feedback. As another example, associations with a time domain resource in a predefined TDM pattern may be communicated over 5G NR time domain resources. These time domain resources may include PDCCH, PDSCH, CSI-RS, and the SS block of a 5G NR transmission.

As introduced above, flexible TDM patterns may assign time domain resources flexibly. By being assigned flexibly, not all of the time domain resource associations may be known in the TDM pattern prior to utilizing the TDM pattern for communications. Rather, some of the time domain resource associations may be based upon criteria (e.g., facts determinable after identification of the TDM pattern), such as priority. Priority may be ascribed based on any of a variety of factors, as will be discussed below.

In a first exemplary embodiment, priority may be ascribed based on the size of the information, or of the signal, under consideration. For example, priority may be assigned based on a load size information or buffer size information of the information to be transmitted. This size may be associated with an uplink or a downlink signal. Higher priority may be assigned for information of a larger size, while lower priority may be assigned for information with a smaller size. Also, information with higher priority may be transmitted earlier than information with lower priority.

In a second exemplary embodiment, priority may be ascribed based on the type of information under consideration. For example, PUCCH with a scheduling request (SR) may be ascribed with a higher priority than a PUCCH or PUSCH with ACK or NACK, which may be ascribed with a higher priority than a PUCCH or PUSCH with CSI, which may be ascribed with a higher priority than a PUSCH without UCI. Furthermore, in certain embodiments, PUCCH may have greater (e.g., higher) than or equal priority with UCI, which may have higher priority than a PUSCH without UCI. In additional embodiments, an ACK may have higher priority than a SR, which may have higher priority than an aperiodic CSI, which have higher priority than a CSI period, which may have higher priority than a PUSCH without UCI. In yet further embodiments, a PRACH may have a greatest priority for an uplink signal. Each of these examples may be utilized individually or in combination when determining priority based on the information under consideration.

In certain embodiments, only higher priority information (e.g., information that meets or exceeds a particular priority level) may be transmitted when time domain resources are limited. This may be coordinated by a BS for execution by a UE (e.g., where the BS indicates the priority level cut off for transmitted information). In contrast, all information may be transmitted when time domain resources are not limited. Also, information of a higher priority may be transmitted before information of a lower priority. Accordingly, the delay in transmitting high priority information may be reduced.

As introduced above, a TDM pattern may associate time domain resources among different RATs. This association may be performed for either an uplink signal or a downlink signal. By associating time domain resources among different RATs, communication degradation due to different RATs (e.g., LTE and 5G NR) transmitting using the same carrier frequency (e.g., 1.8 GHz uplink signal) may be avoided. An example of TDM patterns for uplink is provided below in Table 2:

TABLE 2

TDM patterns in uplink

| LTE UL-NR UL | Subframe number | | | | | | | | | |
|---|---|---|---|---|---|---|---|---|---|---|
| TDM pattern | 0 | 1 | 2 | 3 | 4 | 5 | 6 | 7 | 8 | 9 |
| 0 | NR | S | LTE | LTE | LTE | NR | S | LTE | LTE | LTE |
| 1 | NR | S | LTE | LTE | NR | NR | S | LTE | LTE | NR |
| 2 | NR | S | LTE | NR | NR | NR | S | LTE | NR | NR |
| 3 | NR | S | LTE | LTE | LTE | NR | NR | NR | NR | NR |
| 4 | NR | S | LTE | LTE | NR | NR | NR | NR | NR | NR |
| 5 | NR | S | LTE | NR | NR | NR | NR | NR | NR | NR |
| 6 | NR | S | LTE | LTE | LTE | NR | S | LTE | LTE | NR |

Table 2 illustrates patterns of different RATs (e.g., LTE and 5G NR) associated with different time domain resources (e.g., distributed among 10 subframes) as different TDM patterns (e.g., six TDM patterns) during uplink. This may contrast with Table 1, for which the time domain resources may be associated with either uplink or downlink. Each TDM pattern may allocate time domain resources of a set total length (e.g., 10 ms or more for division across all of the 10 subframes of Table 2). For brevity, 5G NR is abbreviated at more simply NR. In certain embodiments, the particular TDM pattern chosen may be flexible. Stated another way, certain TDM patterns may be chosen for use based upon criteria. In contrast with flexible time domain resource associations, this criteria need not be discernable after adopting a particular time pattern. As an example of criteria for choice of TDM patterns, TDM Patterns 0, 1, 3, or 6 may be selected for use when there is more information to be encoded for LTE communications, as opposed to 5G NR communications. However, TDM patterns 2, 4, and 5 may be selected for use when there is more information to be encoded for 5G NR communications, as opposed to LTE communications.

As discussed above, in addition to subframes associated with a particular RAT, certain subframes may be associated as a special subframe, denoted with a letter S. These special subframes may perform various functions during switching from downlink to uplink (e.g., without assignment to a particular RAT). However, time domain resources in these special subframes of a TDM pattern may be encoded with information and not just be a guard period. As an example embodiment in reference to Table 2, a TDM pattern may allocate time domain resources of a special subframe for HARQ ACK feedback for a LTE PDSCH.

In certain embodiments, a TDM pattern may include an uplink pilot time slot (upPTS) or a downlink pilot time slot (DwPTS) in a special subframe to carry to carry information concerning the uplink or downlink signal. In particular embodiments, the special subframe may carry a sounding reference signal (SRS). In further embodiments, the special subframe may include a GP of only one OFDM symbol, where the remaining special subframe symbols are used for 5G NR uplink data transmissions.

In an exemplary embodiment, a mini-slot containing an arbitrary number of OFDM symbols corresponding to a DwPTS length may be carried in the special subframe. Also, a special subframe may include both the DwPTS and the GP. For example, a TDM pattern may first associate time domain resources (e.g., a mini slot or OFDM symbols) with a DwPTS, with the reminder associated with a GP. The number or amount of time domain resources may be of any particular value, as required by the DwPTS, such as {3, 8, 9, 10, 11, 12} OFDM symbol lengths In another exemplary embodiment, a gap length for different symbols can be modified to fit time domain resources encoded with information into a special subframe. For example, information may be encoded in a time domain resource with a particular gap length such that the total length of OFDM signals for the information transmission may be aligned with a length of the special subframe. As another example, mini-slots may be encoded with information and aggregated to fit into a special subframe. As yet another example, information may be encoded in accordance with communication using a particular RAT (e.g., 5G NR) with length modified to fit in the special subframe.

As introduced above, a TDM pattern may associate time domain resources with uplink at a low frequency using the LTE RAT and downlink at a high frequency using the 5G NR RAT. Also, a TDM pattern may associate time domain resources at any level of granularity, including at the OFDM symbol level of granularity or at the granularity of less than a slot. For example, a TDM pattern may associate time domain resources that are less than one slot, but occupies k OFDM symbols, where k is less than seven. These OFDM symbols may be encoded with information such as a preamble, SRS, PUCCH, PDCCH, SS block, SRS, and PUCCH. Thus, by associating time domain resources at less than a subframe level, the latency of data transmissions may be decreased and the performance of important data transmissions may be increased. Furthermore, the associations of time domain resources at varying levels of granularity may be based on priority. For example, the choice of which symbols are to be associated with what information may be determined based upon the priority accorded to the information for encoding on symbols.

Figure 7:
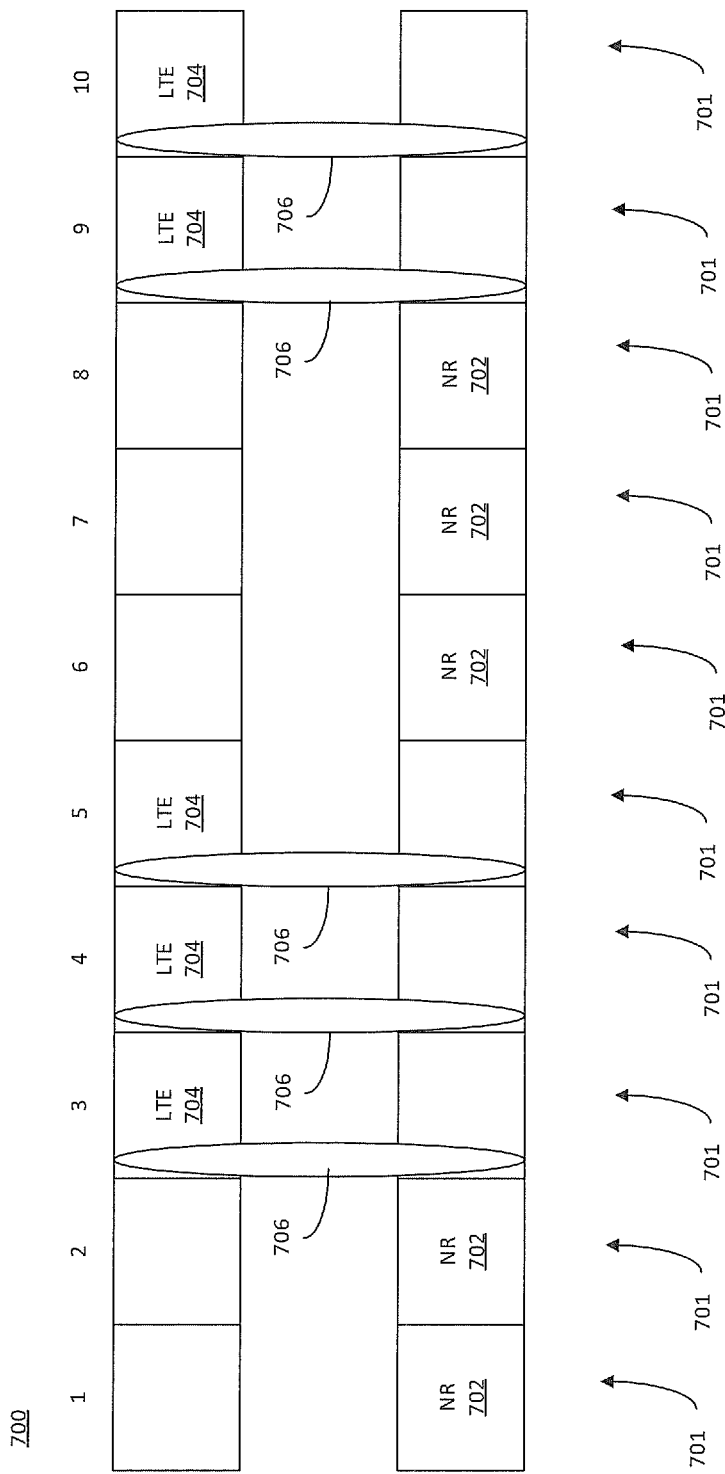
FIG. 7 is a block diagram that illustrates how a TDM pattern may avoid harmonic interference, in accordance with some embodiments.

By associating time domain resources either uplink at a low frequency using the LTE RAT or downlink at a high frequency using the 5G NR RAT, a TDM pattern may avoid harmonic interference (e.g., interference at the 3.5 GHz downlink signal caused by the second harmonic of 1.8 GHz uplink signal). FIG. 7 is a block diagram 700 that illustrates how a TDM pattern may avoid harmonic interference, in accordance with some embodiments. The block diagram 700 includes sequential time domain resources 701 that are associated with either a 3.5 GHz 5G NR downlink signal 702 or a 1.8 GHz LTE uplink signal 704. As noted above, the 1.8 GHz uplink signal may have a second harmonic 706 that may interfere with the 3.5 GHz 5G NR downlink signal if they share the same time domain resource 701. However, the TDM pattern avoids such harmonic interference by associating the 1.8 GHz LTE uplink signal 704 with a different time domain resource 701 than the 3.5 GHz 5G NR downlink signal 702.

For example, it may be undesirable to have the 1.8 GHz LTE uplink signal cause interference (via the second harmonic) with the 3.5 GHz 5G NR downlink signal. This may be especially true when the 3.5 GHz 5G NR downlink signal carries high priority, important scheduling information such as a HARQ ACK or a new data indicator (NDI). Having such interference would increase the block error rate (BLER) of a PDCCH. Accordingly, it may be desirable to have the TDM pattern associating the 1.8 GHz LTE uplink signal with a different time domain resource 701 than the 3.5 GHz 5G NR downlink signal.

In certain embodiments, a UE may receive a PDCCH transmission in a flexible time domain resource associated with a downlink signal. As noted above, flexible time domain resources may be time domain resources that are not associated prior to utilization of the TDM pattern.

In certain embodiments, aspects of a TDM pattern may be communicated from one communication node to another (e.g., a BS to a UE). For example, a transmission time interval (TTI) for the length of a sPUSCH may be communicated from one communication node to another. Also, for a 5G NR RAT with non-fixed time slots (e.g., time slots of variable length), the length of the downlink time slots or uplink time slots may be communicated from one communication node to another. Furthermore, a BS may communicate the scheduling of a sPUSCH or a PUSCH to a UE for transmission in a TDM pattern. For example, three symbols may be used to transmit a sPUSCH, where the first two symbols may be blank and the third symbol may be utilized to transmit the sPUSCH. In particular embodiments, a BS may communicate a PDCCH using two symbols.

In various embodiments, a TDM pattern may also associate time domain resources in accordance with a PUCCH or a PDCCH (e.g., where certain time domain resources carry the PUCCH or PDCCH information). In one exemplary embodiment, a TDM pattern may associate at least one time domain resource for a PDCCH and also at least one time domain resource for a PUCCH. This association may not require that such PDCCH or PUCCH information is actually encoded using the associated time domain resource, but rather that a device may send or receive PDCCH or PUCCH information using the associated time domain resource if desired. For example, in certain embodiments, a sPUCCH may be transmitted from a second slot or subframe and the first slot or subframe may perform blind detection of a PDCCH.

Also, time domain resources may be associated with an LTE PUSCH while avoiding interference with an NR PDCCH transmitted in the first one or two symbols of a subframe. This may be accomplished by, for example, the LTE PUSCH puncturing data at the position of the NR PDCCH and/or rate matching the symbols of the subframe not occupied by the NR PDCCH. Another exemplary way that this can be accomplished is by transmitting time domain resources that may be associated with an LTE PUSCH as an sPUSCH, which may occupy 7 or 3 symbols.

In certain embodiments, the sPUCCH may utilize time domain resources (e.g., two or seven OFDM symbols) for transmission in a TDM pattern, as configurable by a BS. Accordingly, a TDM pattern may associate time domain resources in a manner to avoid harmonic interference between signals and accommodate the communication of PDCCH or PUCCH information.

As introduced above, information for transmission with a particular RAT may be accorded with a higher priority than other RATs. For example, LIE RAT information transmissions may be associated with a higher priority than 5G NR RAT information transmissions in certain embodiments. Alternatively, 5G NR RAT information transmissions may be associated with a higher priority than LTE RAT information transmissions in other embodiments. Furthermore, time domain resources associated with a particular RAT may be predefined, while time domain resources associated with other RATs may not be predefined (e.g., be flexible).

In certain embodiments, time domain resources may be flexibly associated in a TDM. For example, the time domain resources may be associated based upon results of a LBT procedure. This type of LBT may be performed only once (e.g., one-shot at 9 us or 25 us for sensing) or with random back off. The random back off may be performed in accordance with a service type (e.g., as part of a medium access control (MAC) protocol).

As noted above, any type of time domain resource may be associated in a TDM pattern, including one or more OFDM symbols, a mini-slot or a plurality of mini slots, a time slot or a plurality of time slots, one or more subframes, one or more radio frames, or a fixed length of time. The fixed length of time may be determined (e.g., coordinated) from a base station. For example, a fixed length of time may be as 0.125 milliseconds (ms), 0.25 ms, 0.5 ms, 1 ms, 5 ms, or 10 ms. BSs (e.g., gNB and eNB) may coordinate the time domain resources for association in a TDM pattern by backhaul signaling via, for example, the X2 port, Xn interface, or OAM. In certain embodiments, it may be desirable to have fixed (e.g., consistent) time domain resources for information that my require high reliability, such as a PUCCH, PUSCH carrying uplink control information, or a PRACH.

In certain embodiments, LBT may be utilized in a variety of manners for determination of flexible time domain resource associations. As one example, for a high priority information transmission, LBT may not need to be performed prior to transmission of the high priority information. Examples of high priority information for transmission may include a PRACH, PUCCH with SR, PUCCH or PUSCH with ACK or NACK, and PDCCH.

As another example, the type of LBT utilized may be dependent upon the type of information being transmitted. For example, short uplink transmissions may utilize a particular type of LBT (e.g., one shot) while longer uplink transmissions may utilize another type of LBT (e.g., random rollback LBT).

Figure 8:
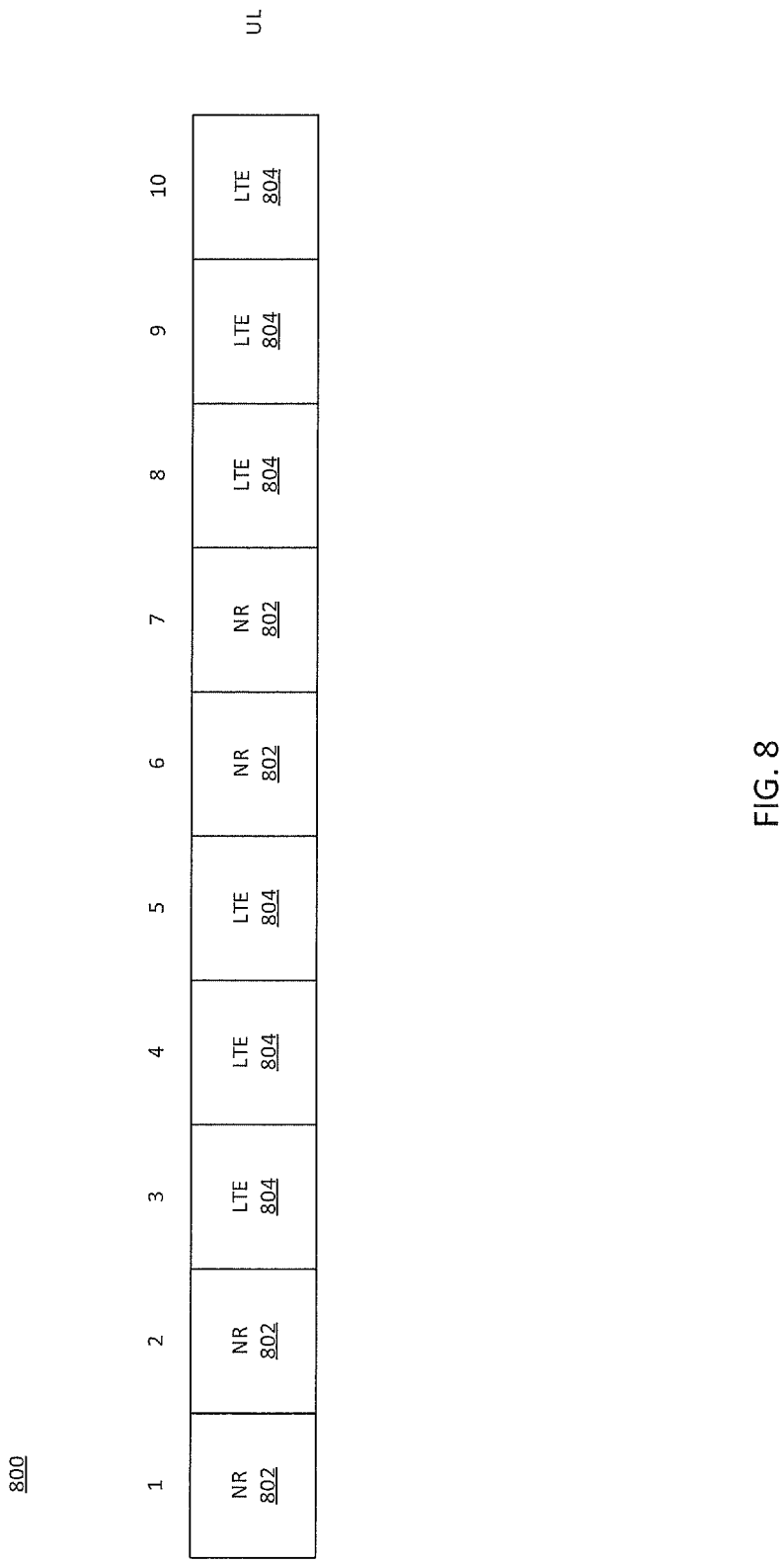
FIG. 8 is a block diagram 800 that illustrates a predefined TDM pattern for uplink, in accordance with some embodiments.

As introduced above, TDM patterns may be predefined. FIG. 8 is a block diagram 800 that illustrates a predefined TDM pattern for uplink, in accordance with some embodiments. The predefined TDM pattern may associate different time domain resources with a particular RAT for uplink. For example, the predefined TDM pattern may associate certain time domain resources (e.g., subframes) with either 5G NR 1.8 GHz uplink 802 or LTE 1.8 GHz uplink 604.

Also, as noted above, a TDM pattern may associate time domain resources in accordance with feedback between downlink and uplink signals. For example, a UE may send a HARQ feedback (e.g., HARQ ACK feedback) as part of a PUSCH in reply to a PDSCH. Also, as another example, a preamble may be sent as feedback in accordance with time domain resource associated with a PRACH.

Figure 9:
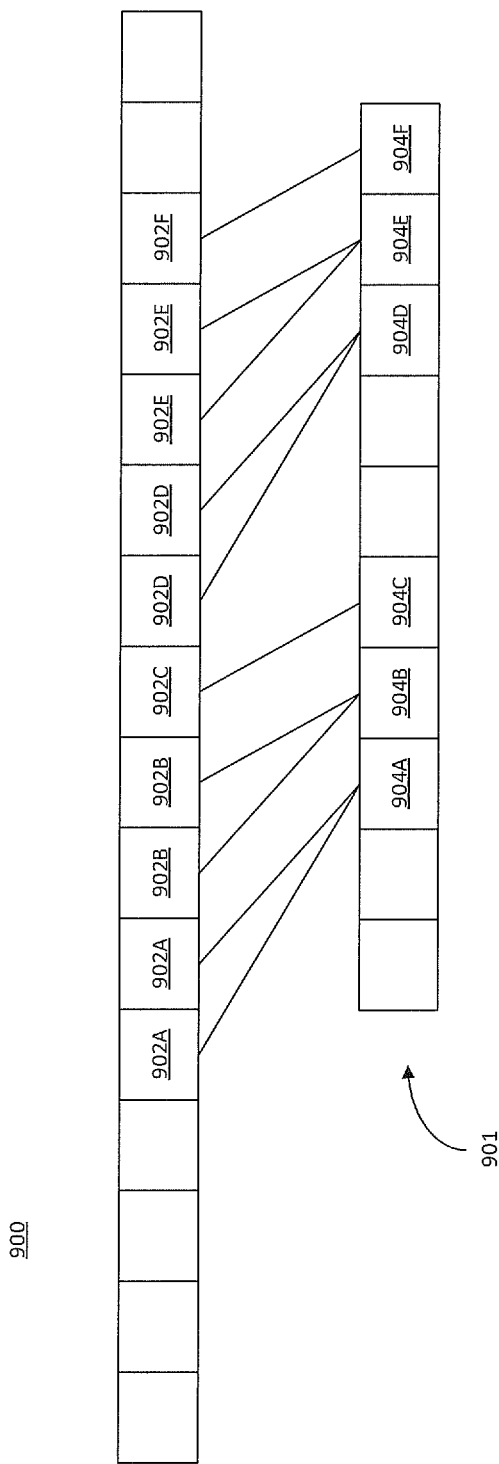
FIG. 9 is a block diagram 900 that illustrates a TDM pattern that includes hybrid automatic repeat request (HARD) feedback signals, in accordance with some embodiments.

FIG. 9 is a block diagram 900 that illustrates a TDM pattern that includes HARQ feedback signals, in accordance with some embodiments. The block diagram 900 may include time domain resources 902A-902F associated with a 1.8 GHz LTE downlink PDSCH. The block diagram 900 also illustrates a TDM pattern 901 where time domain resources 904A-904F are associated with a 1.8 GHz LTE uplink HARQ feedback signal (e.g., a HARQ ACK signal). For example, time domain resource 904A may be a HARQ ACK signal for time domain resources 902A, time domain resource 904B may be a HARQ ACK signal for time domain resources 902B, time domain resource 904C may be a HARQ ACK signal for time domain resources 902C, time domain resource 904D may be a HARQ ACK signal for time domain resources 902D, time domain resource 904E may be a HARQ ACK signal for time domain resources 902E, and time domain resource 904F may be a HARQ ACK signal for time domain resources 902F. The time domain resources of the TDM pattern 901 that are not associated with the HARQ ACK, may be associated with the same or other RATs in either uplink or downlink. In certain embodiments, the TDM pattern of FIG. 9 may correspond to TDM pattern 0 of Table 2, above.

In certain embodiments, a TDM pattern may associate time domain resources of variable length. The length may be variable based upon the type of information for transmission. For example, a HARQ feedback signal (e.g., a HARQ ACK signal) may require fewer symbols for transmission than the number of symbols in a slot. Accordingly, the HARQ ACK signal may be sent with only the required number of symbols for the HARQ ACK, with the other unused time domain resources associated with other information in a TDM pattern.

Figure 10:
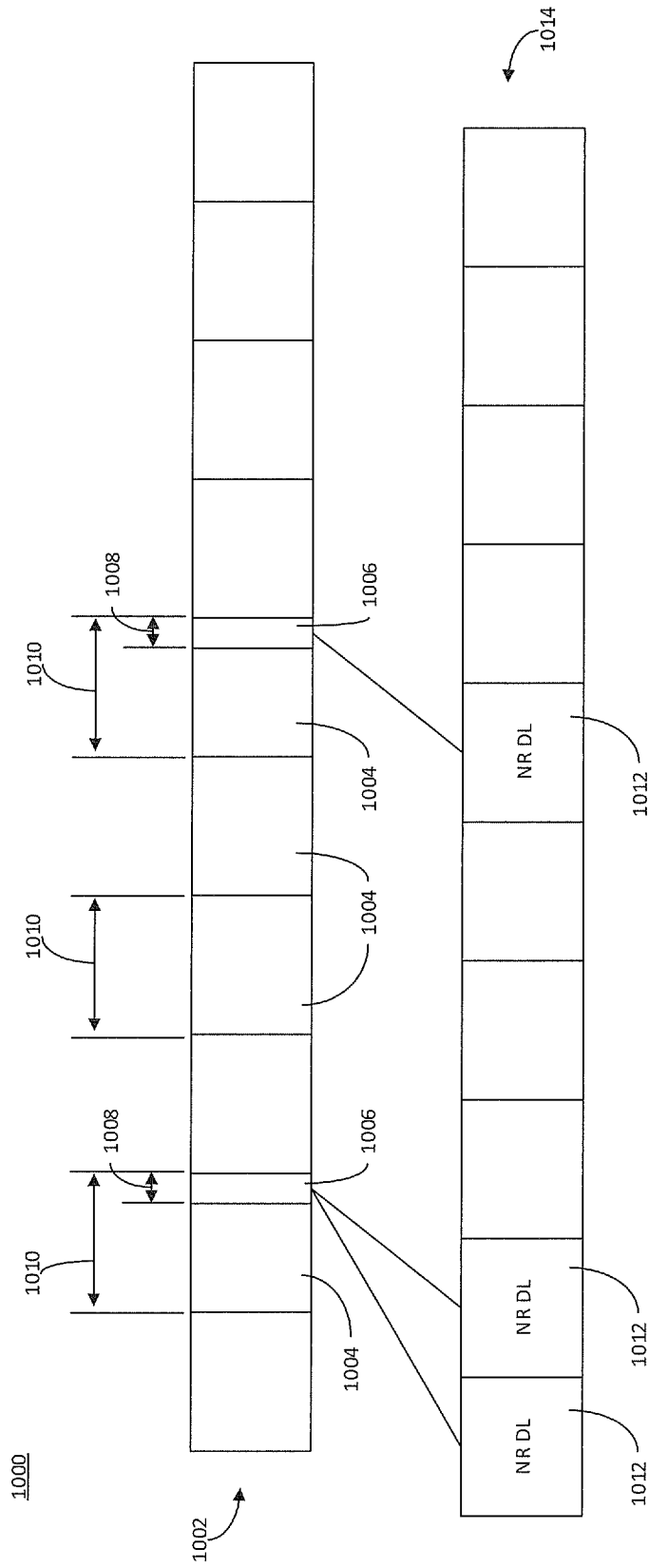
FIG. 10 is a block diagram that illustrates a TDM pattern that associates time domain resources of variable length, in accordance with some embodiments.

FIG. 10 is a block diagram 1000 that illustrates a TDM pattern that associates time domain resources of variable length, in accordance with some embodiments. The TDM pattern 1002 may include slots 1004 and a 5G NR PUCCH 1006 associated with a time domain resource of a PUCCH length 1008 that is smaller than a slot length 1010. Each PUCCH 1006 may be a HARQ feedback signal (e.g., a HARQ ACK feedback signal) for a 5G NR downlink signal 1012 that may be associated with a single time domain resource or multiple time domain resources of a downlink signal 1014. By associating time domain resources for a PUCCH 1006 to be smaller than a full slot 1004, the unused time domain resources in the slot 1004 (e.g., time domain resources not associated with the PUCCH 1006) may be associated with other information (thus fully utilizing the time domain resources in the slot 1004). Accordingly, more information may be sent within a slot 1004 than just a PUCCH 1006.

Similarly, the PUCCH may be sent in an earlier time slot by being included in otherwise unused time domain resources (e.g., included in a slot with information that does not need the time domain resources of a full slot). This may be desirable to reduce NR downlink PDSCH feedback delay. In further embodiments, time domain resources associated other types of information, such as a PRACH, may be associated in a similar manner (e.g., be smaller than a full slot 1004) such that the unused time domain resources in the slot may be associated with yet other information.

As introduced above, a TDM pattern may associate time domain resources with a uplink signal that encodes a HARQ feedback signal. The HARQ feedback signal (e.g., ACK or NACK) may be transmitted in accordance with a k+4 subframe timing relationship. This means that for a PDSCH in subframe k, a HARQ feedback signal may be expected at subframe k+4. However, in other embodiments, it may be desirable for a TDM pattern to associate information other than a HARQ feedback signal at the k+4 subframe (e.g., due to the need to avoid harmonic interference or the presence of higher priority signals than the HARQ feedback signal). Accordingly, the HARQ feedback signal may be transmitted in a TDM pattern at other than a k+4 subframe.

As one exemplary embodiment, the HARQ feedback signal may be transmitted at a predefined timing that may not necessarily be k+4. For example, the HARQ feedback signal may be sent as part of a TDM patter as k+n, where n is other than 4.

As another exemplary embodiment, a HARQ feedback signal may be sent as part of a flexible TDM pattern, where the time domain resource associated with the HARQ feedback signal may be dependent upon other criteria. This other criteria may be a priority associated with the information for transmission in the TDM pattern. Furthermore, the TDM pattern may be chosen from a candidate list of TDM patterns (e.g., chosen from one of an arbitrary number of TDM patterns, such as TDM patterns #2, 4, or 5 of Table 2 above) based on criteria such as priority. In particular embodiments, the candidate list of TDM patterns may be indicated to a communication node (e.g., where a candidate list of three is noted with two bits). For example, the candidate list of TDM patterns may be sent to a UE via a RRC message or a SIB message.

As another exemplary embodiment, a HARQ feedback signal may be sent as part of a predefined TDM pattern that is communicated from one communication node to another. The predefined TDM pattern may include a specific time domain resource that may be utilized for the HARQ feedback signal (e.g., as a LTE or 5G NR uplink signal). For example, a specific TDM pattern may be indicated from one communication node to another as a map, as discussed above. An example of a specific TDM pattern may be a TDM pattern that associates time 10 domain resources with "5G NR, 5G NR, LTE, LTE, 5G NR, 5G NR, 5G NR, 5G NR, 5G NR, LTE", where 5G NR is associated with a downlink signal and LTE is associated with an uplink signal. Accordingly, the timing of a HARQ feedback signal may be reassigned in a TDM pattern, while still allowing for transmission of a PUSCH as feedback to a PDCCH.

As introduced above, a TPM pattern may coordinate how communication nodes communicate using carrier signals to avoid problems such as harmonic interference or RAT congestion. Advantageously, by using a common TDM pattern, different devices need not be otherwise coordinated in order to communicate with each other. This simplification of coordination among communication nodes is desirable as coordination among different communication nodes may expend resources (e.g., by backhaul signaling).

For example, as discussed above, a TDM pattern may be communicated by UE forwarding. UE forwarding may allow a BS to coordinate communications of a UE with multiple BSs without the BSs communicating directly with each other. UE forwarding may include a first BS informing a UE of a first TDM pattern for communications over a period of time via RRC signaling or PDCCH. Then, the UE may forward the first TDM pattern to a second BS via PUCCH or PUSCH. Then the second BS and the UE may perform communications in accordance with the first TDM pattern. Furthermore, the first BS may continue to communicate with the UE using a second TDM that avoids interference with the first TDM pattern.

In a number of embodiments, TPM patterns may associate time domain resources with different sub-carrier spacing and/or different numerologies (e.g., waveform parameters, such as a cyclic prefix) for subcarrier spacing. In certain embodiments, a TPM pattern may have a different transport block size (TBS) for time domain resources that transmit a PUSCH. For example, for higher frequency data transmissions (e.g., 3.5 GHz) with sub-carrier spacing at 30 kHz, the TBS of a PUSCH may be at half of the sub-carrier spacing (e.g., 15 kHz) when configured the same physical resource block (PRB) number and same modulation and coding scheme and redundancy version field ($I_{MCS}$). Also, different numerologies may be related to each other (e.g., in a look up table data structure) according to an allocated PRB number and $I_{MCS}$.

In certain embodiments, a TBS may be determined by having a scaling factor applied to sub-carrier spacing. For example, a TBS may be m when sub-carrier spacing is 15 kHz, with the TBS being m/2 when the sub-carrier spacing is 30 kHz. In particular embodiments, if the scaling factor is not an integer, the scaling factor may be approximated by rounding to the nearest integer (or rounding to a nearest number in a look up table data structure, discussed above, that is also related to a scaling factor). In further embodiments, TBS may be determined according to a relationship that relates the TBS to numerology.

In various embodiments, TPM patterns may have different sub-carrier spacing that includes different slot aggregation size, or different TTI bundling size or repetition times for transmission of a PUSCH. For example, if sub-carrier spacing is 15 kHz, the TTI bundling size or repetition time may be 2 slots. As another example, if the sub-carrier spacing is 30 kHz, the TTI bundling size or repetition times may be 4 slots. As another example, if the sub-carrier spacing is 60 kHz, the TTI bundling size or repetition times may be 8 slots. As another example, if the sub-carrier spacing is 120 kHz, the TTI bundling size or repetition times may be 16 slots. In other words, the slot aggregation size, or different TTI bundling size or repetition times for transmitting the PUSCH can be scaled with sub-carrier spacing. Accordingly, the coverage of PUSCH in high frequency transmissions may be improved.

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, module, etc. can be configured to perform one or more of the functions described herein. The term "configured to" or "configured for" as used herein with respect to a specified operation or function refers to a processor, device, component, circuit, structure, machine, module, etc. that is physically constructed, programmed and/or arranged to perform the specified operation or function.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method performed by a first communication node, the method comprising:
   receiving a radio resource control (RRC) message;
   identifying, based on the RRC message, a time division multiplex (TDM) pattern that associates a plurality of time domain resources with at least two radio access technologies comprising long term evolution (LTE) and fifth generation (5G) new radio (NR), wherein:
      the TDM pattern is a modification of a LTE time domain duplex (TDD) configuration,
      at least one first time domain resource of the plurality of time domain resources is associated with LTE,
      at least one second time domain resource of the plurality of time domain resources is associated with 5G NR;
   transmitting a first uplink signal using the at least one first time domain resource associated with LTE at a first frequency, wherein the first frequency is an operating frequency for LTE;
   transmitting a second uplink signal using the at least one second time domain resource associated with 5G NR at the first frequency; and
   receiving a downlink signal at a second frequency, wherein the second frequency is an operating frequency for 5G NR.

2. The method of claim 1, wherein the first frequency is 1.8 gigahertz.

3. The method of claim 1, wherein the plurality of time domain resources comprise at least one of: frames, subframes, slots, mini-slots, or symbols.

4. The method of claim 1, wherein:
   the TDM pattern is communicated between LTE and 5G NR base stations via an X2 interface.

5. The method of claim 1, further comprising:
   determining at least one uplink time domain resource of the TDM pattern with reference to at least one downlink time domain resource of the TDM pattern, wherein the downlink signal is received based on the at least one downlink time domain resource.

6. The method of claim 5, further comprising:
   transmitting a hybrid automatic repeat request (HARM) feedback using the at least one uplink time domain resource of the TDM pattern in response to the downlink signal.

7. The method of claim 1, wherein the second frequency is 3.5 gigahertz.

8. A first communication node comprising a processor and a memory, wherein the memory stores instructions that, when executed, cause the processor to:
   transmit, to a communication device, a radio resource control (RRC) message indicating a time division multiplex (TDM) pattern that associates a plurality of time domain resources with at least two radio access technologies comprising long term evolution (LTE) and fifth generation (5G) new radio (NR), wherein:
      the TDM pattern is a modification of a LTE time domain duplex (TDD) configuration,
      at least one first time domain resource of the plurality of time domain resources is associated with LTE,
      at least one second time domain resource of the plurality of time domain resources is associated with 5G NR;
   receive a first uplink signal using the at least one first time domain resource associated with LTE at a first frequency, wherein the first frequency is an operating frequency for LTE;
   receive a second uplink signal using the at least one second time domain resource associated with 5G NR at the first frequency; and
   transmit a downlink signal at a second frequency, wherein the second frequency is an operating frequency for 5G NR.

9. The first communication node of claim 8, wherein the first frequency is 1.8 gigahertz.

10. The first communication node of claim 8, wherein the plurality of time domain resources comprise at least one of: frames, subframes, slots, mini-slots, or symbols.

11. The first communication node of claim 8, wherein the instructions, when executed, further cause the processor to:
    communicate the TDM pattern with a second communication node via an X2 interface.

12. The first communication node of claim 8, wherein the instructions, when executed, further cause the processor to:
    determine at least one uplink time domain resource of the TDM pattern with reference to at least one downlink time domain resource of the TDM pattern, wherein the downlink signal is transmitted based on the at least one downlink time domain resource.

13. The first communication node of claim 12, wherein the instructions, when executed, further cause the processor to:
    receive a hybrid automatic repeat request (HARD) feedback using the at least one uplink time domain resource of the TDM pattern.

14. The first communication node of claim 8, wherein the second frequency is 3.5 gigahertz.

15. A first communication node comprising a processor and a memory, wherein the memory stores instructions that, when executed, cause the processor to:

receive a radio resource control (RRC) message;
identify, based on the RRC message, a time division multiplex (TDM) pattern that associates a plurality of time domain resources with at least two radio access technologies comprising long term evolution (LTE) and fifth generation (5G) new radio (NR), wherein:
 the TDM pattern is a modification of a LTE time domain duplex (TDD) configuration,
 at least one first time domain resource of the plurality of time domain resources is associated with LTE,
 at least one second time domain resource of the plurality of time domain resources is associated with 5G NR;
transmit a first uplink signal using the at least one first time domain resource associated with LTE at a first frequency, wherein the first frequency is an operating frequency for LTE;
transmit a second uplink signal using the at least one second time domain resource associated with 5G NR at the first frequency; and
receive a downlink signal at a second frequency, wherein the second frequency is an operating frequency for 5G NR.

16. The first communication node of claim 15, wherein the first frequency is 1.8 gigahertz and the second frequency is 3.5 gigahertz.

17. The first communication node of claim 15, wherein the plurality of time domain resources comprise at least one of: frames, subframes, slots, mini-slots, or symbols.

18. The first communication node of claim 15, wherein:
 the TDM pattern is communicated between LTE and 5G NR base stations via an X2 interface.

19. The first communication node of claim 15, wherein the instructions, when executed, further cause the processor to:
 determine at least one uplink time domain resource of the TDM pattern with reference to at least one downlink time domain resource of the TDM pattern, wherein the downlink signal is received based on the at least one downlink time domain resource.

20. The first communication node of claim 19, wherein the instructions, when executed, further cause the processor to:
 transmit a hybrid automatic repeat request (HARM) feedback using the at least one uplink time domain resource of the TDM pattern in response to the downlink signal.

* * * * *